(12) United States Patent
Koulopoulos

(10) Patent No.: US 11,174,985 B1
(45) Date of Patent: Nov. 16, 2021

(54) CAMERA-POSITIONING APPARATUSES AND METHODS

(71) Applicant: Anastasios Michael Koulopoulos, North Andover, MA (US)

(72) Inventor: Anastasios Michael Koulopoulos, North Andover, MA (US)

( * ) Notice: Subject to any disclaimer, the term of this patent is extended or adjusted under 35 U.S.C. 154(b) by 0 days.

(21) Appl. No.: 17/324,868

(22) Filed: May 19, 2021

Related U.S. Application Data

(60) Provisional application No. 63/174,669, filed on Apr. 14, 2021, provisional application No. 63/157,794, (Continued)

(51) Int. Cl.
| | |
|---|---|
| *F16M 13/02* | (2006.01) |
| *H04N 5/225* | (2006.01) |
| *G03B 17/56* | (2021.01) |
| *F16M 11/24* | (2006.01) |
| *F16M 11/08* | (2006.01) |
| *G06F 1/16* | (2006.01) |
| *F16M 11/04* | (2006.01) |

(52) U.S. Cl.
CPC .......... *F16M 13/022* (2013.01); *F16M 11/08* (2013.01); *F16M 11/24* (2013.01); *G03B 17/561* (2013.01); *G06F 1/1607* (2013.01); *H04N 5/2257* (2013.01); *F16M 11/048* (2013.01); *F16M 2200/027* (2013.01)

(58) Field of Classification Search
CPC ...... G03B 17/56; G03B 17/561; F16M 11/04; F16M 11/12; F16M 11/10; F16M 11/18; F16M 13/022; F16M 11/08; F16M 11/24; F16M 11/048; F16M 2200/027; G06F 1/1607; H04N 5/2257

USPC ........................................................ 396/428
See application file for complete search history.

(56) References Cited

U.S. PATENT DOCUMENTS

| | | | | |
|---|---|---|---|---|
| 2 | A | * 7/1836 | Goulding | D06C 3/00 57/58.49 |
| 2,614,471 | A | * 10/1952 | Markowitz | G03B 15/041 396/422 |

(Continued)

FOREIGN PATENT DOCUMENTS

| | | | |
|---|---|---|---|
| DE | 202011101226 U1 | 8/2011 | |
| DK | 202011101226 * | 8/2011 | ............. H04N 5/225 |
| WO | WO-2014002091 A2 | 1/2014 | |

*Primary Examiner* — Clayton E. LaBalle
*Assistant Examiner* — Kevin C Butler
(74) *Attorney, Agent, or Firm* — Shackelford, Bowen, McKinley & Norton, LLP

(57) ABSTRACT

In certain embodiments, the present disclosure relates to a method of positioning a movable webcam connected to a computer relative to a screen display of the computer while imaging a user in select, reciprocal viewing alignment with the screen display. In one embodiment, a method includes providing a screen display mounting for supporting the movable webcam in a variety of positions relative to the screen display, securing the movable webcam to the mounting for imaging the user, and then positioning the mounting in relationship to the screen display for supporting the movable webcam in a select screen display region substantially coextensive with the image being observed by the user. The viewing of the image by the user facilitates the viewing of the user viewing the image in select, reciprocal viewing alignment therewith.

17 Claims, 10 Drawing Sheets

Related U.S. Application Data filed on Mar. 7, 2021, provisional application No. 63/153,934, filed on Feb. 25, 2021, provisional application No. 63/150,213, filed on Feb. 17, 2021, provisional application No. 63/138,935, filed on Jan. 19, 2021, provisional application No. 63/066,865, filed on Aug. 18, 2020, provisional application No. 63/054,349, filed on Jul. 21, 2020, provisional application No. 63/052,909, filed on Jul. 16, 2020, provisional application No. 63/029,523, filed on May 24, 2020.

(56) References Cited

U.S. PATENT DOCUMENTS

| | | | | |
|---|---|---|---|---|
| 4,473,177 A * | 9/1984 | Parandes | | G03B 17/566 224/191 |
| 5,260,731 A * | 11/1993 | Baker, Jr. | | B60R 11/04 224/556 |
| 6,027,085 A * | 2/2000 | Ruther | | F16M 11/041 248/187.1 |
| 7,126,627 B1 * | 10/2006 | Lewis | | H04N 7/144 348/14.16 |
| 8,593,567 B2 * | 11/2013 | Xiao | | H04N 5/2251 348/373 |
| 8,754,923 B2 * | 6/2014 | Chong | | H04N 5/23219 348/14.01 |
| 8,941,715 B1 * | 1/2015 | McNelley | | H04N 7/142 348/14.16 |
| 9,894,259 B2 * | 2/2018 | Kakou | | H04N 7/144 |
| 2005/0041966 A1 * | 2/2005 | Johnson | | F16M 11/041 396/428 |
| 2005/0196163 A1 * | 9/2005 | Mootz | | F16M 11/041 396/428 |
| 2008/0088696 A1 * | 4/2008 | Giraldo | | H04N 7/144 348/14.08 |
| 2012/0169838 A1 | 7/2012 | Sekine | | |
| 2012/0257004 A1 * | 10/2012 | Smith | | H04N 7/144 348/14.16 |
| 2016/0187763 A1 * | 6/2016 | Fromm | | F16M 11/10 396/428 |
| 2016/0191755 A1 * | 6/2016 | Fromm | | G03B 17/561 348/373 |
| 2017/0068149 A1 * | 3/2017 | Fromm | | G03B 17/563 |
| 2017/0152989 A1 * | 6/2017 | Gulanes | | F16B 2/065 |
| 2019/0249402 A1 * | 8/2019 | Whitfield | | F16M 13/022 |
| 2019/0277022 A1 * | 9/2019 | Francis | | E04B 1/003 |
| 2019/0309897 A1 * | 10/2019 | Ehlis Pirretas | | F16M 13/022 |
| 2019/0309898 A1 * | 10/2019 | Krake | | F16B 5/126 |
| 2019/0376639 A1 * | 12/2019 | Bowman | | F16M 11/10 |
| 2020/0124227 A1 * | 4/2020 | Fine | | H04B 1/3888 |
| 2020/0340618 A1 * | 10/2020 | Hickey | | F16M 11/041 |
| 2021/0006751 A1 * | 1/2021 | Visosky | | H04N 7/147 |

* cited by examiner

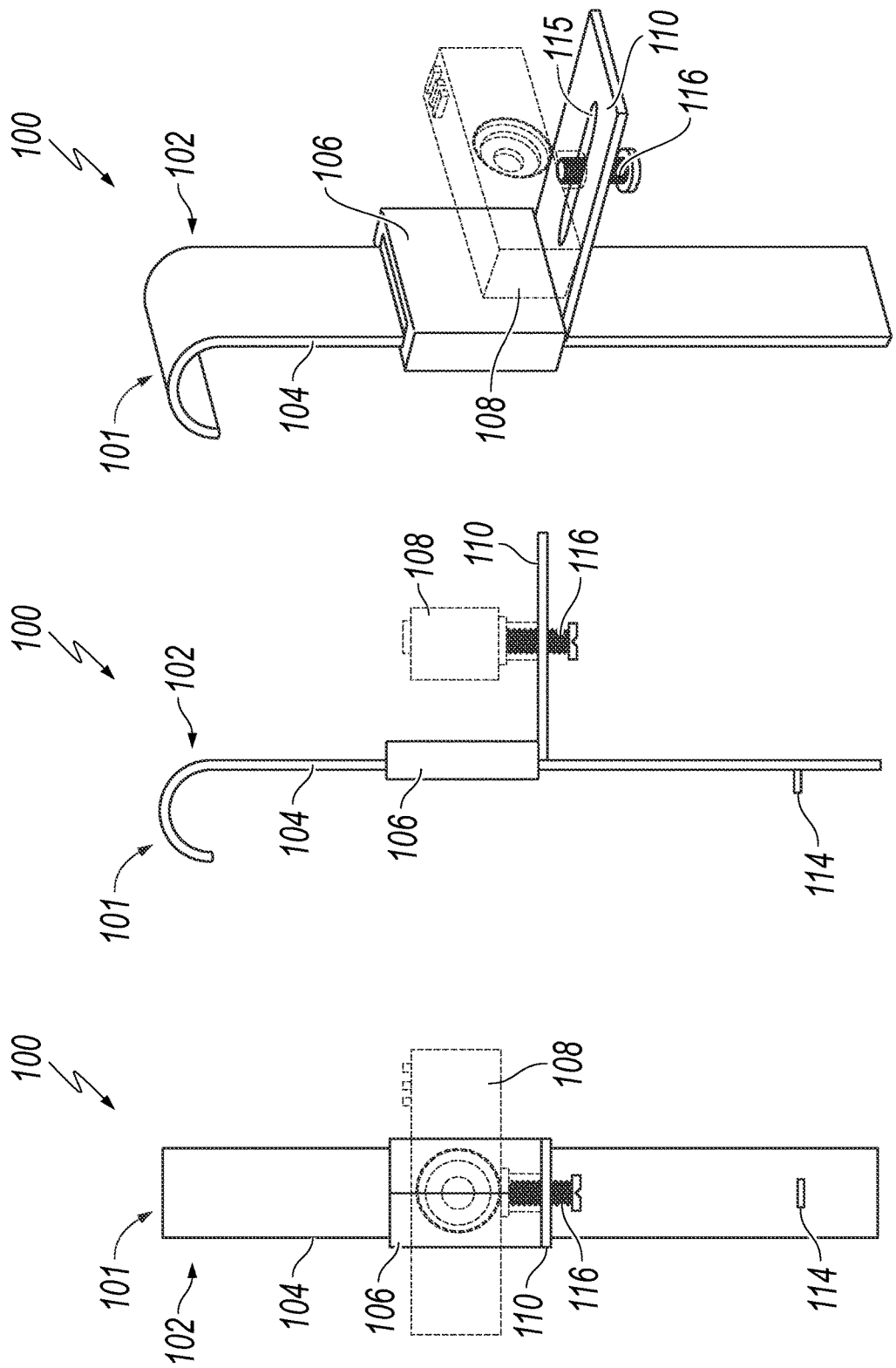

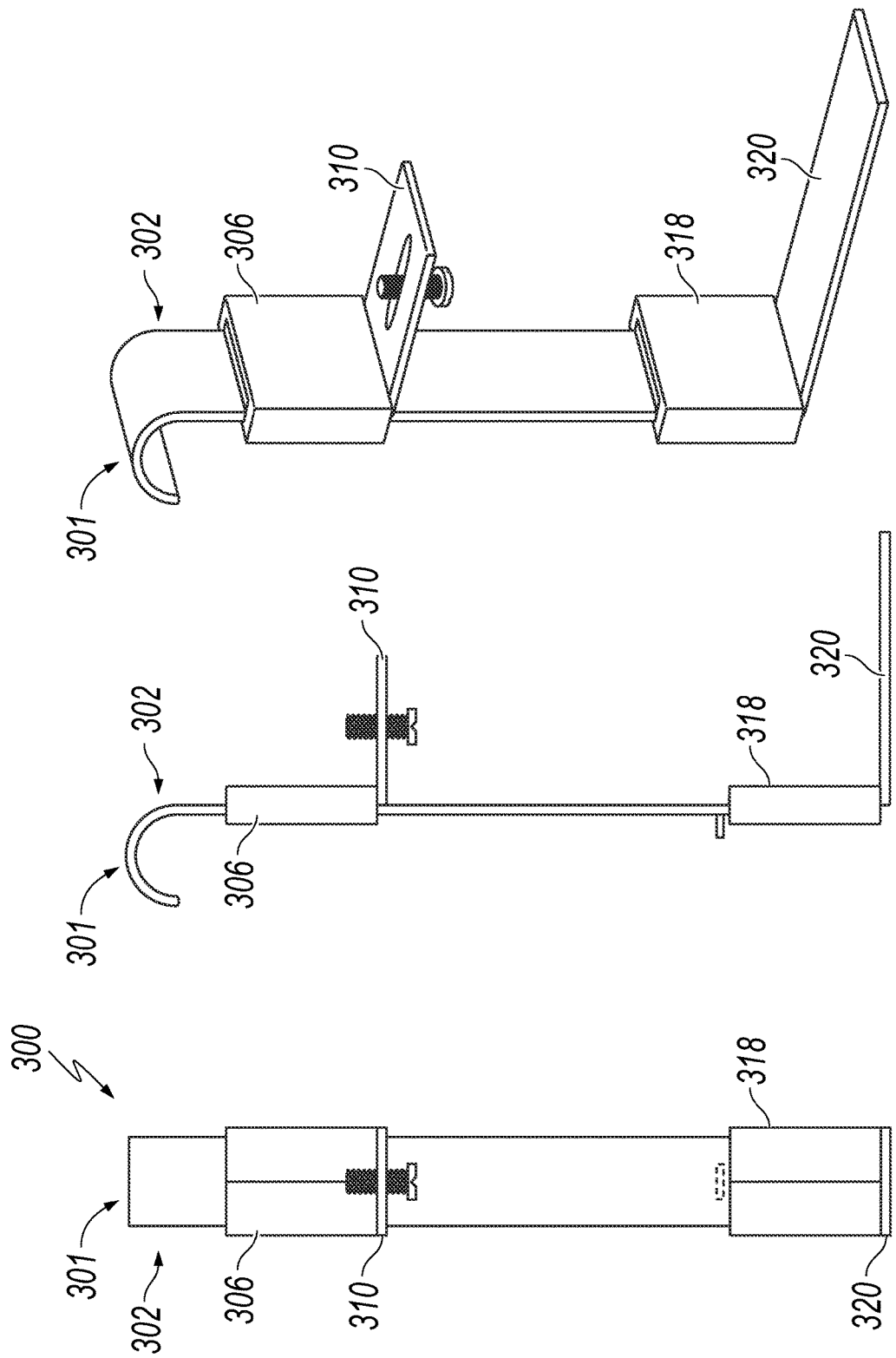

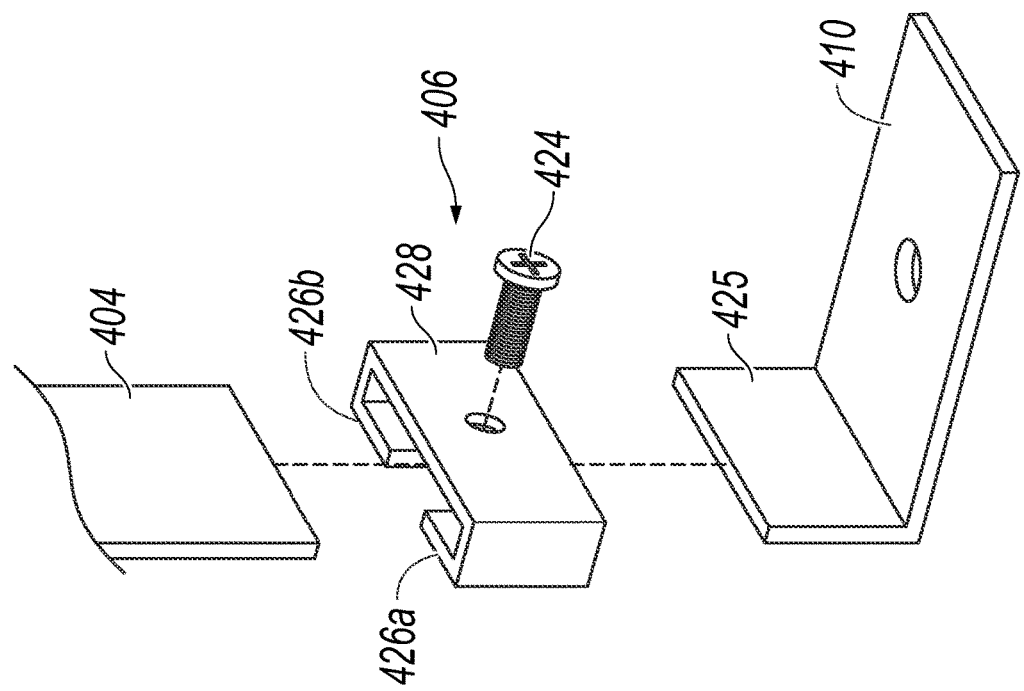
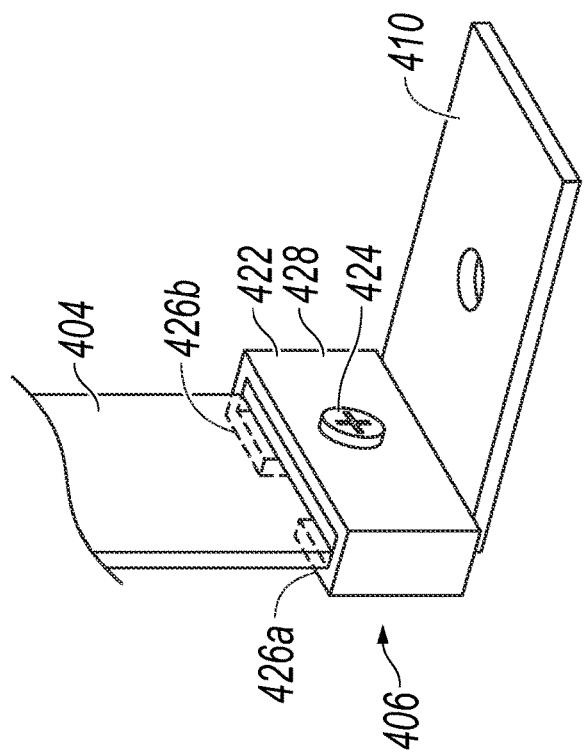
FIG. 4B
FIG. 4A

CAMERA-POSITIONING APPARATUSES AND METHODS

CROSS-REFERENCES TO RELATED APPLICATIONS

This application claims the benefit under 35 U.S.C. § 119(e) of U.S. Provisional Patent Application No. 63/029,523 filed May 24, 2020, U.S. Provisional Patent Application No. 63/052,909 filed Jul. 16, 2020, U.S. Provisional Patent Application No. 63/054,349 filed Jul. 21, 2020, U.S. Provisional Patent Application No. 63/066,865 filed Aug. 18, 2020, U.S. Provisional Patent Application No. 63/138,935 filed Jan. 19, 2021, U.S. Provisional Patent Application No. 63/150,213 filed Feb. 17, 2021, U.S. Provisional Patent Application No. 63/153,934 filed Feb. 25, 2021, U.S. Provisional Patent Application No. 63/157,794 filed Mar. 7, 2021, and U.S. Provisional Patent Application No. 63/174,669 filed Apr. 14, 2021. U.S. Provisional Patent Application No. 63/029,523, U.S. Provisional Patent Application No. 63/052,909, U.S. Provisional Patent Application No. 63/054,349, U.S. Provisional Patent Application No. 63/066,865, U.S. Provisional Patent Application No. 63/138,935, U.S. Provisional Patent Application No. 63/150,213, U.S. Provisional Patent Application No. 63/153,934, U.S. Provisional Patent Application No. 63/157,794, and U.S. Provisional Patent Application No. 63/174,669 are hereby incorporated by reference as if fully set forth herein.

TECHNICAL FIELD

This disclosure relates in general to the field of accessories for electronic devices, and more particularly, but not by way of limitation, to camera-positioning apparatuses and methods.

BACKGROUND

Video cameras, often referred to as webcams, can feed or stream an image or video in real time to or through a computer to a computer network, such as the Internet. Webcams are commonly used, for example, in videotelephony. Increasingly, webcams are being used in professional settings as a replacement for in-person meetings.

SUMMARY

In certain embodiments, the present disclosure relates to a method of positioning a movable webcam connected to a computer relative to a screen display of the computer while imaging a user in select, reciprocal viewing alignment with the screen display. In one embodiment, a method includes providing a screen display mounting for supporting the movable webcam in a variety of positions relative to the screen display, securing the movable webcam to the mounting for imaging the user, and then positioning the mounting in relationship to the screen display for supporting the movable webcam in a select screen display region substantially coextensive with an image being observed by the user. The viewing of the image by the user facilitates the viewing of the user viewing the image in select, reciprocal viewing alignment therewith.

In another embodiment, the method includes providing a screen display attachment of transparent material for mounting to and movement across an upper region of the screen display while extending downwardly there across as well as providing a mounting slide for reciprocating movement along the screen display attachment in support of the movable webcam in a variety of positions relative to the screen display. In this manner, the movable webcam may be secured to the mounting slide for imaging the user and further allowing positioning of the screen display attachment and mounting slide in relationship to the screen display for supporting the movable webcam in a select screen display region substantially coextensive with an image being observed by the user. The viewing of the image by the user thus facilitates the viewing of the user viewing the image in select, reciprocal viewing alignment therewith.

In yet another embodiment, the present disclosure includes an apparatus for positioning a movable webcam connected to a computer relative to a screen display of the computer while imaging a user in select, reciprocal viewing alignment with the screen display. The apparatus of this particular embodiment includes a generally transparent screen display attachment for mounting to and movement across an upper region of the screen display while suspended downwardly there across, a mounting slide for slidable securement to and reciprocating movement along the generally transparent screen display attachment in support of the movable webcam in a variety of positions relative to the screen display, and a securing member for securing the movable webcam to the mounting slide for imaging the user. In this manner, the generally transparent screen display attachment and the mounting slide are configured to be positioned in relationship to the screen display for supporting the movable webcam in a select screen display region substantially coextensive with an image being observed by the user, so that the viewing of the image by the user facilitates the viewing of the user viewing the image in select, reciprocal viewing alignment therewith.

In yet further embodiments, the generally transparent screen display attachment includes a generally transparent plastic member having an angulated upper region for hooked placement on, and concomitant suspension from, a top edge of the screen display. In yet an additional embodiment, the mounting slide includes a transparent plastic mounting shelf adapted to slide vertically along the generally transparent screen display attachment for select positioning of the movable webcam. The mounting slide may also be formed of substantially clear plastic and includes mounting jaws that slidably engage opposite sides of the generally transparent screen display attachment.

In yet additional embodiments, the present disclosure relates to a method of positioning a movable webcam connected to a computer relative to a screen display of the computer while imaging a user in select, reciprocal viewing alignment with the screen display, wherein the method includes providing a transparent screen display mounting for supporting the movable webcam relative to the screen display and hanging the screen display mounting in relationship to the screen display for supporting the movable webcam in a select screen display region substantially coextensive with an image being observed by the user. It is in this manner that the viewing of the image by the user facilitates the viewing of the user viewing the image in select, reciprocal viewing alignment therewith. Consistent with this embodiment the screen display mounting may be formed with a substantially arcuate upper region for hanging along an upper edge of the screen display in support of the movable webcam.

In yet additional embodiments, the present disclosure includes an apparatus for positioning a movable webcam connected to a computer relative to a screen display of the computer while imaging a user in select, reciprocal viewing alignment with the screen display, wherein the apparatus includes a screen display attachment of transparent material for mounting to and movement across an upper region of the screen display while extending downwardly thereacross and a shelf extending from the screen display attachment for support of the movable webcam in a variety of positions relative to the screen display. In this manner, the screen display attachment may be configured to be positioned in relationship to the screen display for supporting the movable webcam in a select screen display region substantially coextensive with an image being observed by the user, so that the viewing of the image by the user facilitates the viewing of the user viewing the image in select, reciprocal viewing alignment therewith.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 1A is a front view of a camera-positioning apparatus;

FIG. 1B is a side view of the camera-positioning apparatus of FIG. 1A;

FIG. 1C is a front-perspective view of the camera-positioning apparatus of FIG. 1A;

FIG. 3A is a front view of a camera-positioning apparatus;

FIG. 3B is a side view of the camera-positioning apparatus of FIG. 3A;

FIG. 3C illustrates an alternative configuration of the camera-positioning apparatus of FIG. 3A;

FIG. 4A illustrates a mounting slide in an assembled configuration;

FIG. 4B illustrates the mounting slide of FIG. 4A in a disassembled configuration;

DETAILED DESCRIPTION

Figure 2C:
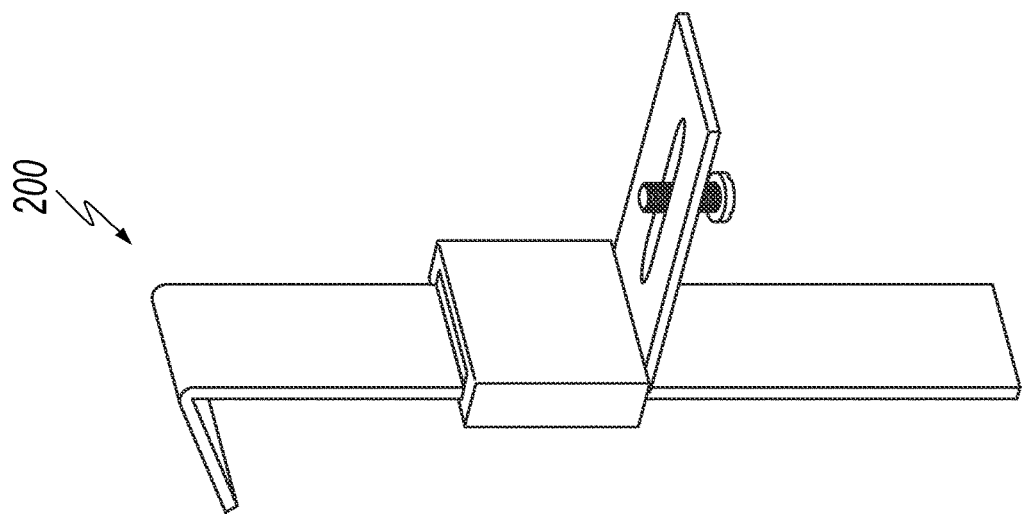
FIG. 2C is a front-perspective view of the camera-positioning apparatus of FIG. 2A.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

Using webcams has become commonplace due to the extensive use of web-based meeting and conferences (such as Skype®, Zoom®, GoToMeeting®, and WebEx®). These meetings and conferences are meant to replace or supplant face to face meetings. It is critical in these experiences, as in their face-to-face physical equivalents, to maintain eye contact in order to make the connection between the users as meaningful as possible. Without eye contact, conversations are awkward and far less effective. For purposes of this patent application, a "webcam" can include any video camera that feeds or streams an image or video to or through a computer and/or a computer network, such as the Internet.

With current webcams, one of two situations typically occurs: a user looks at the person they are talking to on their screen or at other screen content, thereby not looking at the camera which is typically located elsewhere (e.g., offset from the center of the screen and located on its perimeter); or, the user looks at the camera which prevents them from seeing the person on the screen that they are talking to. In both cases the disconnected nature of the conversation undermines the objective of making a meaningful human connection through the web-based video. Without reciprocal viewing alignment, both users or one user may be looking at their cameras while neither is looking at the other person they are communicating with. This effectively obviates any utility of having a video connection since neither party to the conversation is viewing the other party but rather looking at their cameras. For purposes of this disclosure, "reciprocal viewing alignment" means that any two remote users communicating and viewing each other through video and using a given camera-positioning apparatus can effectively look at each other on their screen display directly in the eyes while also appearing to each other to be looking at each other directly in the eyes. For purposes of this patent application, the term "screen display" refers to any output device for presentation of information in a visual form. Periodically, for clarity, screen displays might be referred to herein as "screens," "monitors," "displays," or the like. Unless specifically stated otherwise, or otherwise understood within the context as used, each such reference can be applied generally to screen displays.

Webcams that are incorporated into laptop or desktop computers, tablets, or mobile devices (such as smartphones) are positioned in a way that they are not directly in the line of sight of the screen, causing the user's gaze to look away from the webcam and to naturally look to the image of the person(s) they are communicating with. However, if one or both of the people communicating via the video conference are looking at the person's image on screen, rather than at the camera, they are breaking eye contact with the other user. On the other hand, if they look at the camera they are not able to see the other person.

Webcams that are used as part of a video or web conferencing system are also not able to be positioned in front of the screen display so that the user is looking directly at the person(s) they are speaking with. This is due to there being no way to do that without significantly obscuring the user's view of the screen, either because; A) the mounting apparatus (a tripod, articulating arm, or other mount) obscure the view of the screen, B) the webcam is not positioned on the screen and the further from the screen and closer to the user that it is the more of the screen it obscures, or C) in the case of a laptop there is no way to position the web cam near the screen due to the position of the keyboard.

Webcams integrated into the center of computer displays, while not yet available, will require that users upgrade to displays with these capabilities and will therefore limit the computers/laptops/tablets, desktop screens on which users can maintain eye contact by requiring them to use only those devices. Any webcam integrated as part of the actual viewing area of the display will also be permanently positioned so that it cannot be repositioned as needed by the user. Further, users of such display-integrated webcams would be locked-in to whatever webcam happens to be built into a given display.

The present disclosure provides examples of camera-positioning apparatuses that enable positioning of a movable webcam relative to a screen display while imaging the user in select, reciprocal viewing alignment with the screen display. In various embodiments, a small webcam can be positioned on a transparent camera-positioning apparatus that can be attached to any screen display, either by an integrated hanger that easily attaches to the display's top, or mounted to a base in front of the screen. The camera's vertical and horizontal position can be adjusted, for example, so that it is directly in the user's line of sight and thereby allows the user to appear to others, with whom he or she is engaged in a video-call, to be looking directly at them. Stated somewhat differently, in various embodiments, any two remote users communicating and viewing each other through video and using various camera-positioning apparatuses described herein can effectively look at each other directly and in the eyes while also appearing to each other to be looking at each other directly in the eyes.

In various embodiments, camera-positioning apparatuses such as those described herein can be constructed from transparent or semi-transparent materials that allow users to see almost all of their screen display except for that portion which may be obscured by a webcam. Additionally, in various embodiments, such camera-positioning apparatuses can provide the ability to position the webcam to any position on the screen display by sliding it horizontally and vertically, thereby allowing flexible positioning relative to what the user wants to see on the screen. In certain embodiments, these camera-positioning apparatuses can be portable devices that can be used easily with any display or monitor to allow participants in a video conference to both look at the other person while also looking at the camera.

In various embodiments, certain camera-positioning apparatuses described herein allow the user to look directly at their screen display and thereby maintain eye-contact with the person(s) with whom they are speaking.

In various embodiments, certain camera-positioning apparatuses described herein use a sliding shelf and a sleeve, with friction adjustment, on a transparent strip of material, such as plexiglass, acrylic, plastic, glass, or any other transparent material, that hangs over the top of a computer monitor, laptop screen, desktop screen, or mobile device.

In various embodiments, certain camera-positioning apparatuses described herein allow users to have a web video call and to look directly at the person they are talking to on their screen so that they can maintain eye contact and create a sense of sincerity, connection, and engagement.

In various embodiments, certain camera-positioning apparatuses described herein mount easily with no additional hardware needed by hanging off the top of a screen display, or by attaching to a base unit.

In various embodiments, certain camera-positioning apparatuses described herein allow for the use of multiple shelves. In an example, other devices, such as a ring light or light emitting diode (LED) light, can be attached to the top of a given camera-positioning apparatus on a separate shelf that is located at or near the top of the given camera-positioning apparatus, thereby not obscuring the viewing area of the screen display.

Existing webcams are large and bulky and cannot be mounted easily in front of or on a computer screen without obscuring the user's view of the screen. Traditional mounting systems do not take this into account. Tripods and other photographic mounting systems cannot be used since they would: (A) act to obscure the user's view of the screen; (B) rest on the keyboard if a laptop computer is being used; or (C) be positioned too far away from the screen causing the user's image on the receiving end of a video conversation to appear to be looking past the camera.

Webcams built into laptops, desktops, monitors, tablets, and mobile devices are typically offset and integrated into the perimeter of the viewing surface, making it impossible to look at the camera and also at the person with whom the user is conducting the web video call. Various embodiments of camera-positioning apparatuses as described herein can overcome these challenges by providing a universal mounting system that is clear and can be positioned anywhere on any screen display. Further, in various embodiments, such camera-positioning apparatuses can be positioned at any point on a screen display, including a projected image, such that it can be used to more precisely track the user's gaze to determine what they are looking at. In various cases, these features can assist people with disabilities as well as be used to track eye movement for behavioral, marketing, or other cases where the point on the display at which the user is looking needs to be determined.

FIGS. 1A-C illustrate a camera-positioning apparatus 100. FIGS. 1A, 1B and 1C are front, side, and front-perspective views of the camera-positioning apparatus 100, respectively. In various embodiments, the camera-positioning apparatus 100 enables positioning of a movable webcam connected to a computer relative to a screen display of the computer while imaging the user in select, reciprocal viewing alignment with the screen display. The camera-positioning apparatus 100 can be constructed, in whole or in part, from generally transparent materials, such as transparent and semi-transparent materials as described previously.

The camera-positioning apparatus 100 includes a display attachment 101 and a mounting slide 106. The display attachment 101 serves as a body of the camera-positioning apparatus 100. In the illustrated embodiment, the display attachment 101 includes a hook 102 and a friction mount 104. The friction mount 104 may sometimes be referred to as a slider mount.

The hook 102 corresponds to an upper region, or hanger region, of the display attachment 101. The hook 102 serves as an attachment for mounting to, and for facilitating horizontal movement across, an upper region of the screen display while suspended downwardly thereacross. As shown, the hook 102 is angulated for hooked placement on, and concomitant suspension from, a top edge of the screen display. For illustrative purposes, the hook 102 is shown to be substantially arcuate and, more particularly, U-shaped. However, other shapes, angles, and configurations will be apparent to one skilled in the art after a detailed review of the present disclosure.

The friction mount 104 corresponds to a lower region of the display attachment 101 generally beneath the hook 102. As will be described in greater detail below, the friction mount 104 engages, and provides a sliding range of freedom for, the mounting slide 106. One or more spacers 114 are shown in a lower section of the friction mount 104. In various embodiments, the one or more spacers 114 can help keep the camera-positioning apparatus 100 parallel to a given screen or monitor on which it is installed.

The mounting slide 106, sometimes referred to as a slider, includes a shelf 110 extending therefrom. The shelf 110 can support, for example, a movable webcam 108. As shown, the shelf 110 can include a slot 115 and a securing member 116 for securement of the movable webcam 108 for imaging the user therebefore. The securing member 116 can be, for example, a screw that, potentially in combination with the shelf 110, conforms to one or more standards, such that the shelf 110 may be used as a universal camera mount. As shown, the shelf 110 can adjustably receive the securing member 116 via the slot 115. In some embodiments, the movable webcam 108 can instead rest on the shelf 110 without being secured by the securing member 116.

In certain embodiments, the mounting slide 106 is configured for slidable securement and reciprocating movement along the friction mount 104 in support of the movable webcam 108 in a variety of positions relative to the screen display. For example, in the illustrated embodiment, the mounting slide 106 is fitted to the friction mount 104 so as to enable a user to selectively position, or slide, the mounting slide 106 vertically along the friction mount 104, with the mounting slide 106 staying in place, and maintaining its user-selected position, due to adequate friction between it and the friction mount 104.

Figure 2B:
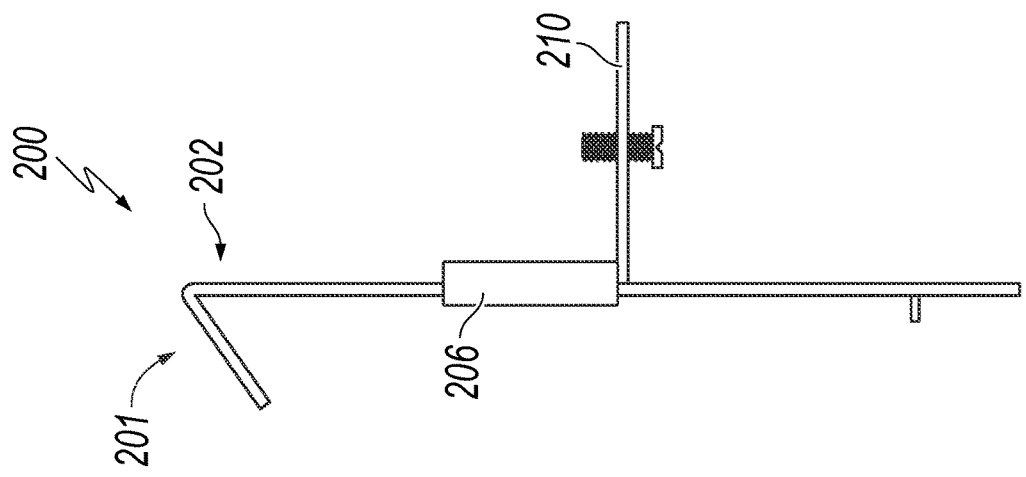
FIG. 2B is a side view of the camera-positioning apparatus of FIG. 2A.
Figure 2A:
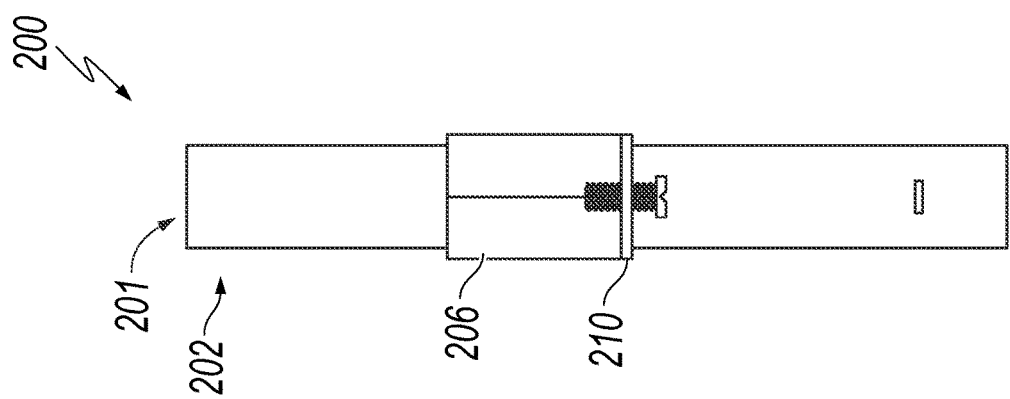
FIG. 2A is a front view of a camera-positioning apparatus.

FIGS. 2A-C illustrate a camera-positioning apparatus 200. FIGS. 2A, 2B and 2C are front, side, and front-perspective views of the camera-positioning apparatus 200, respectively. In various embodiments, in similar fashion to the camera-positioning apparatus 100 of FIGS. 1A-C, the camera-positioning apparatus 200 enables positioning of a movable webcam connected to a computer relative to a screen display of the computer while imaging the user in select, reciprocal viewing alignment with the screen display. The camera-positioning apparatus 200 can be constructed, in whole or in part, from generally transparent materials, such as transparent and semi-transparent materials as described previously.

The camera-positioning apparatus 200 includes a display attachment 201 and a mounting slide 206. The mounting slide 206 includes a shelf 210. In general, the display attachment 201, the mounting slide 206 and the shelf 210 can function, and be constructed, as described relative to the display attachment 101, the mounting slide 106 and the shelf 110, respectively, of FIGS. 1A-C. In the embodiment illustrated in FIGS. 2A-C, the display attachment 201 is shown to include a hook 202 that differs, in part, from the hook 102 shown in FIGS. 1A-C. In more detail, the hook 202 defines an upper region or section of the display attachment 101 that is generally bent. For example, as shown, the hook 202 can be angulated at an angle greater than 90 degrees relative to the display attachment 101, such that an interior angle thereof that faces a top edge of a screen display is less than 90 degrees.

FIGS. 3A-B illustrate a camera-positioning apparatus 300 with multiple mounting slides. FIGS. 3A and 3B are front and side views of the camera-positioning apparatus 300, respectively. In various embodiments, in similar fashion to the camera-positioning apparatus 100 of FIGS. 1A-C, the camera-positioning apparatus 300 enables positioning of a movable webcam connected to a computer relative to a screen display of the computer while imaging the user in select, reciprocal viewing alignment with the screen display. The camera-positioning apparatus 300 can be constructed, in whole or in part, from generally transparent materials, such as transparent and semi-transparent materials as described previously.

The camera-positioning apparatus 300 includes a display attachment 301, a first mounting slide 306, and a second mounting slide 318. In general, the display attachment 301 and the first mounting slide 306 can function, and be constructed, as described relative to the display attachment 101 and the mounting slide 106, respectively, of FIGS. 1A-C. The display attachment 301 includes a hook 302 similar to the hook 102 of FIGS. 1A-C. However, it should be appreciated that the hook 302 may have any suitable shape or angle, inclusive of the configuration shown and described relative to FIGS. 2A-C. The first mounting slide 306 is shown to include a shelf 310 in similar fashion to the shelf 110 of FIGS. 1A-C.

In more detail, the second mounting slide 318 can include a shelf 320 and generally function, and be constructed similarly to, the first mounting slide 306. In a typical embodiment, the shelf 320 of the second mounting slide 318 is longer than the shelf 310 of the first mounting slide 306. In some embodiments, the second mounting slide 318 can serve as a stable base for the camera-positioning apparatus 300 without the need to hang from a screen display, such that the camera-positioning apparatus 300 is freestanding. For illustrative purposes, the second mounting slide 318 is shown beneath the first mounting slide 306. However, it should be appreciated that, in other embodiments, the first mounting slide 306 and the second mounting slide 318 can be reversed relative to each other such that the second mounting slide 318 is above the first mounting slide 306.

FIG. 3C illustrates an alternative configuration of the camera-positioning apparatus 300. In the example of FIG. 3C, the second mounting slide 318 serves as a stable base for the camera-positioning apparatus 300 as described relative to FIGS. 3A-B. In the configuration of FIG. 3C, however, the first mounting slide 306 and the second mounting slide 318 are reversed in orientation relative to the hook 302 so as to turn inward. In various embodiments, the alternative configuration shown in FIG. 3C enables the camera-positioning apparatus 300 can be placed as close as possible, for example, to a screen display.

FIGS. 4A-B illustrate an example two-piece design for a mounting slide 406 in relation to a friction mount 404. FIG. 4A illustrates the mounting slide 406 in an assembled configuration, while FIG. 4B illustrates the mounting slide 406 in a disassembled configuration. The mounting slide 406 includes a sleeve 422 and a shelf 410. The sleeve 422 includes mounting jaws 426a and 426b that are angulated relative to a main body 428. The shelf 410 includes a tab 425. The sleeve 422 and similar sleeves may sometimes be referred to as sliders.

For assembly, the mounting jaws 426 and 426b slidably engage a first side of the friction mount 404 and the tab 425 of the shelf 410 is inserted, into the sleeve 422, between a second, opposite side of the friction mount 404 and the main body 428. As shown, the mounting jaws 426a and 426b are angulated such that, after assembly, they impart an interference, slip fit with the friction mount 404 for temporary positioning of the mounting slide 406 there along. In some embodiments, a threaded member 424, such as a screw, may be configurably fastened into a threaded hole in the main body 428 for further facilitating secured positioning of the sleeve 422 relative to the tab 425 and the friction mount 404. In various embodiments, the mounting slide 406 can be used as the mounting slide 106, 206 or 306 of FIGS. 1A-C, 2A-C, and 3A-C, respectively.

Figure 5:
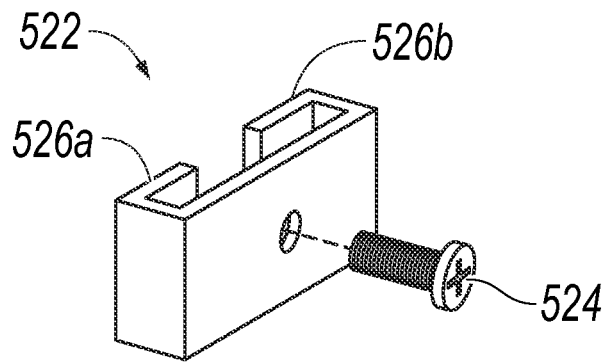
FIG. 5 illustrates a perspective view of a sleeve.

FIG. 5 illustrates a perspective view of a sleeve 522. In similar fashion to the sleeve 422 of FIGS. 4A-B, the sleeve 522 includes mounting jaws 526a and 526b and a threaded member 524 for facilitating secured positioning. In various embodiments, the mounting slide 506 can be used as the mounting slide 106, 206 or 306 of FIGS. 1A-C, 2A-C, and 3A-C, respectively.

Figure 6A:
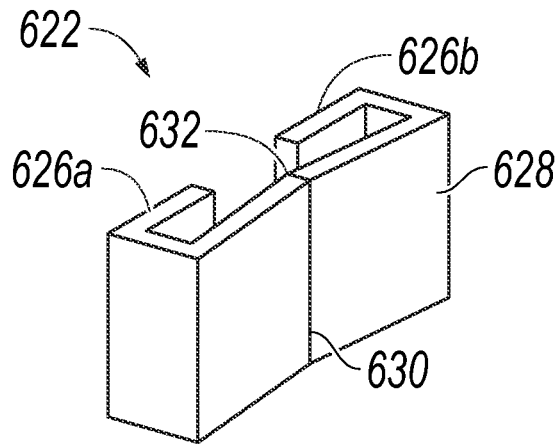
FIG. 6A is top-front perspective view of a sleeve.
Figure 6B:
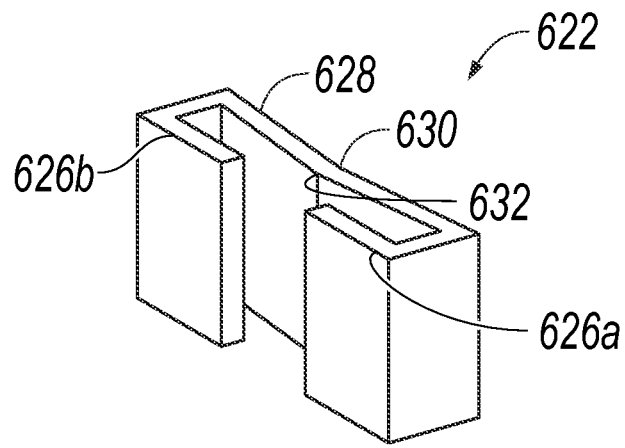
FIG. 6B is a top-rear perspective view of the sleeve of FIG. 6A.
Figure 7A:
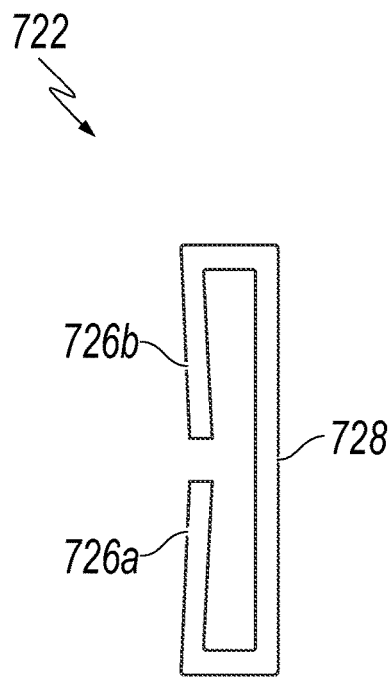
FIG. 7A is a top view of a sleeve.
Figure 7B:
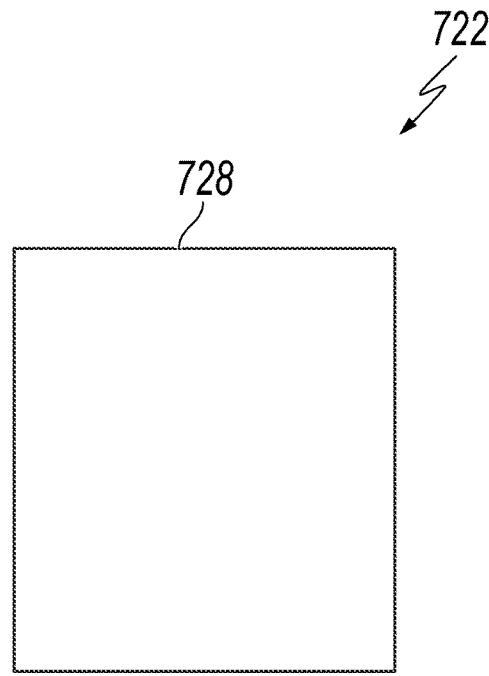
FIG. 7B is a front view of the sleeve of FIG. 7A.
Figure 7C:
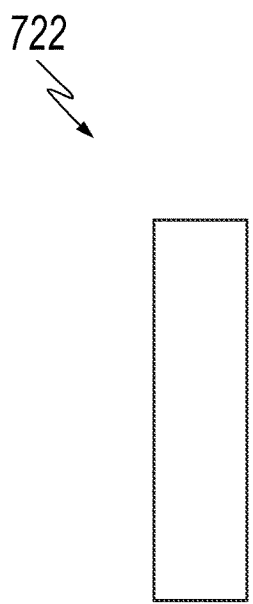
FIG. 7C is a side view of the sleeve of FIG. 7A.
Figure 7D:
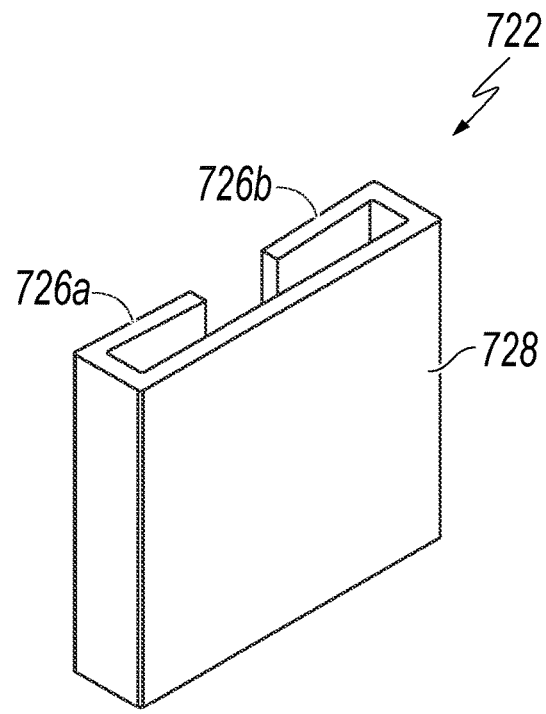
FIG. 7D is a perspective view of the sleeve of FIG. 7A.

FIGS. 6A-B illustrate a sleeve 622. FIG. 6A is top-front perspective view of the sleeve 622, while FIG. 6B is a top-rear perspective view of the sleeve 622. The sleeve 622 includes mounting jaws 626a and 626b that are angulated relative to a main body 628. In the example of FIGS. 6A-B, the main body 628 is bent at a bend point 630 to create a slight bulge 632. In certain embodiments, the slight bulge 632 imparts additional tension with a friction mount similar to the friction mount 104 or 404 of FIGS. 1A-C and 4A-B, respectively.

FIGS. 7A-D illustrate a sleeve 722. FIGS. 7A, 7B, 7C and 7D are top, front, side, and perspective views of the sleeve 722, respectively. The sleeve 722 includes mounting jaws 726a and 726b that are angulated relative to a main body 728. In the example of FIGS. 7A-D, the main body 728 is straight rather than bent in the fashion described relative to the main body 628 of the sleeve 622 of FIGS. 6A-B. Additionally, in the example of FIGS. 7A-D, the mounting jaws 726a and 726b are each angulated inward, or toward the main body 728, so as to impart additional tension with a friction mount similar to the friction mount 104 or 404 of FIGS. 1A-C and 4A-B, respectively. In this fashion, when the sleeve 722 is assembled in the fashion shown and described relative to FIGS. 4A-B, for example, the mounting jaws 726a and 726b are angulated in a direction of the friction mount 404, thereby enabling a secure and adjustable fit with such a friction mount.

Figure 8B:
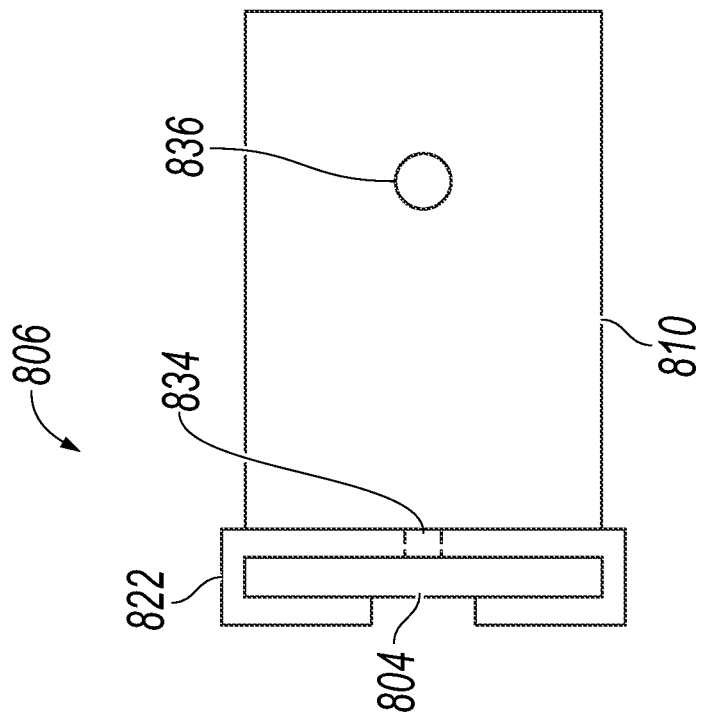
FIG. 8B is a bottom view of the mounting slide of FIG. 8A.
Figure 8A:
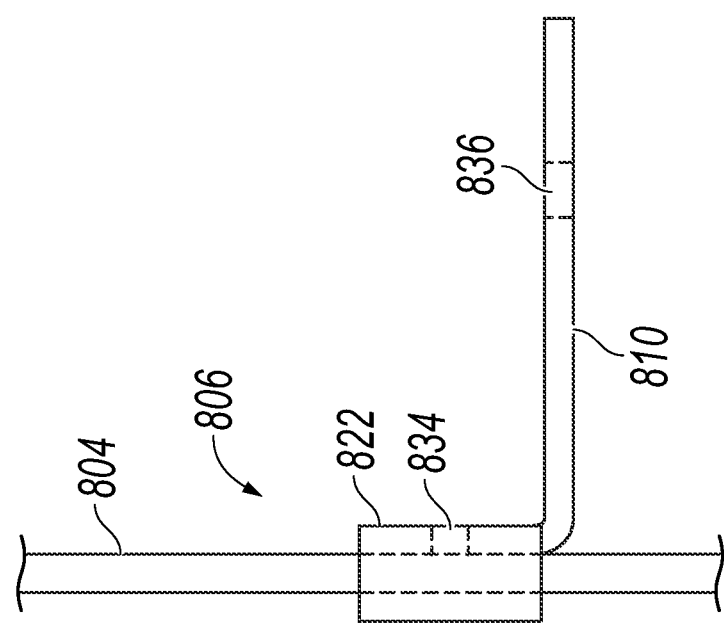
FIG. 8A is side view of a mounting slide as an integrated unit.

FIGS. 8A-B illustrate a mounting slide 806 as an integrated unit. The mounting slide 806 is illustrated in relation to a friction mount 804, with FIG. 8A showing a side view and FIG. 8B showing a bottom view. The mounting slide 806 includes a sleeve 822 and a shelf 810 that, collectively, constitute a single piece for assembly with the friction mount 804. For illustrative purposes, the mounting slide 806 is shown to include a threaded hole 834 for receiving, for example, a threaded member similar to the threaded member 424 or 524 of FIGS. 4A-B and 5, respectively. It should be appreciated, however, that the mounting slide 806 can have any suitable configuration, with or without the threaded hole 834, inclusive of the configuration shown and described relative to FIGS. 6A-B. The shelf 810 is shown to include a threaded hole 836 for receiving, for example, a securing member similar to the securing member 116 of FIGS. 1A-C.

Figure 9:
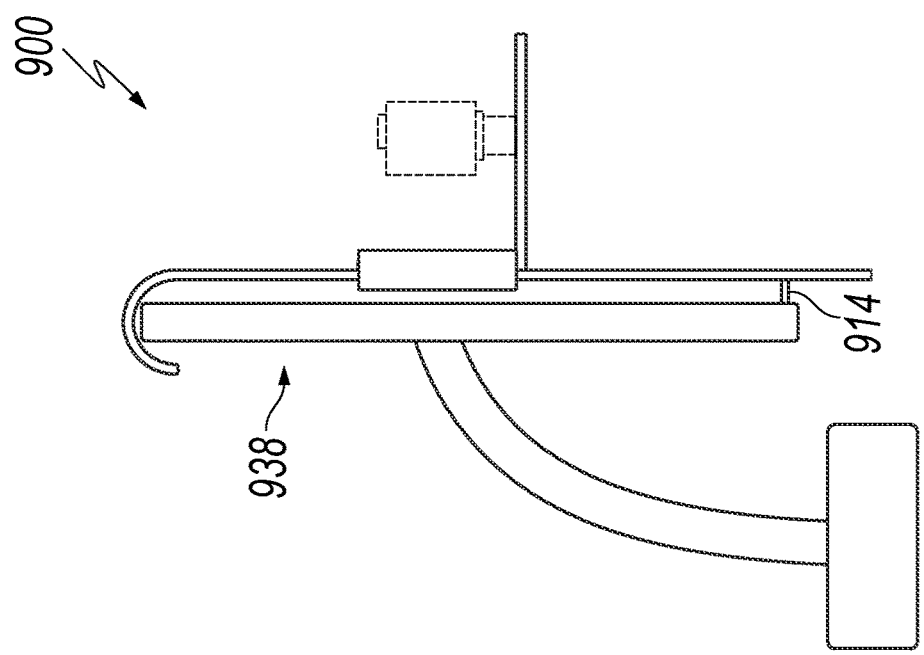
FIG. 9 illustrates an installation of a camera-positioning apparatus on a screen display.

FIG. 9 illustrates an installation of a camera-positioning apparatus 900 on a screen display 938. In the example of FIG. 9, the camera-positioning apparatus 900 is similar to the camera-positioning apparatus 100 shown and described relative to FIGS. 1A-C. In particular, the camera-positioning apparatus 900 is shown to include one or more spacers 914. In various embodiments, the camera-positioning apparatus 900 is advantageous for use with older, wider screen displays.

Figure 10:
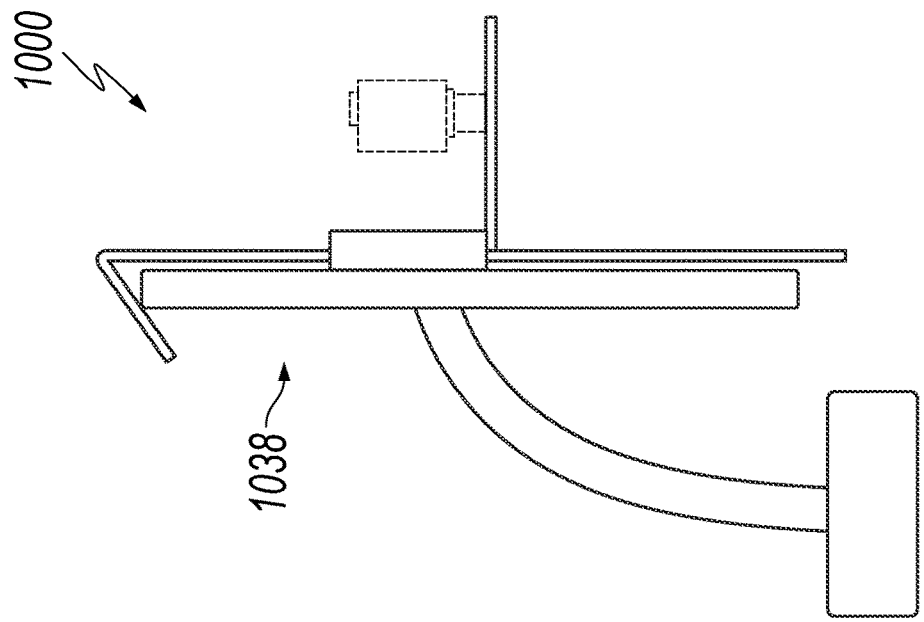
FIG. 10 illustrates an installation of a camera-positioning apparatus on a screen display.

FIG. 10 illustrates an installation of a camera-positioning apparatus 1000 on a screen display 1038. In the example of FIG. 10, the camera-positioning apparatus 1000 is similar to the camera-positioning apparatus 200 shown and described relative to FIGS. 2A-C. As compared to the camera-positioning apparatus 900, the camera-positioning apparatus 1000 excludes spacers and sits substantially flush against the screen display 1038, for example, for a secure universal fit.

Figure 11A:
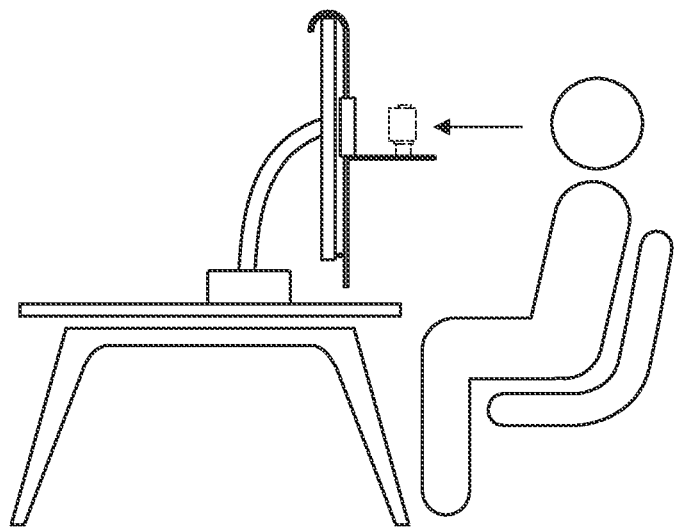
FIGS. 11A and 11B illustrates an example of how camera-positioning apparatuses provide a user with the ability to look directly at their screen display and still maintain eye contact with the person(s) with whom they are speaking.
Figure 11B:
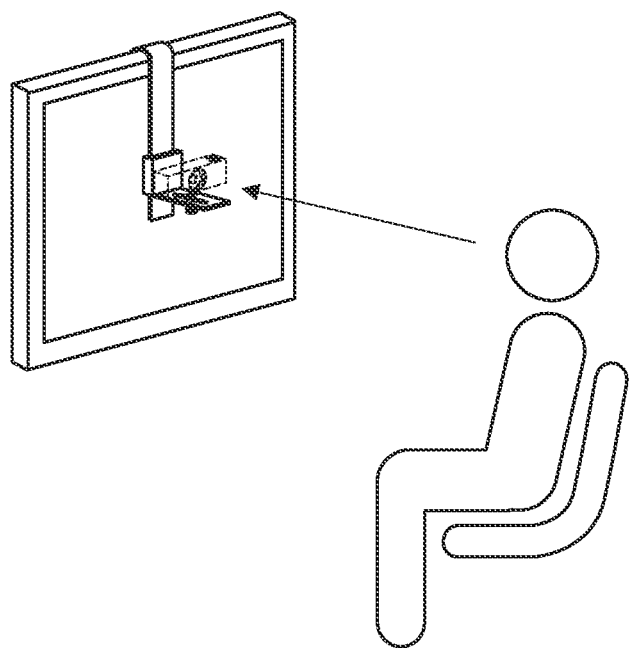

FIGS. 11A and 11B illustrate how camera-positioning apparatuses such as those described above provide a user with the ability to look directly at their screen display and still maintain eye contact with the person(s) with whom they are speaking. In various embodiments, this is achieved in three ways: (1) a webcam can be positioned vertically or horizontally anywhere on the screen, rather than on the top periphery of the screen; (2) the webcam is within the same relative plane as the screen display, as compared to a camera mounted on a device which stands further away from the monitor; and (3) when a camera-positioning apparatus such as those described above is flush, or close to flush, with the screen display, the webcam obscures the least possible amount of space on the screen display.

Figure 12:
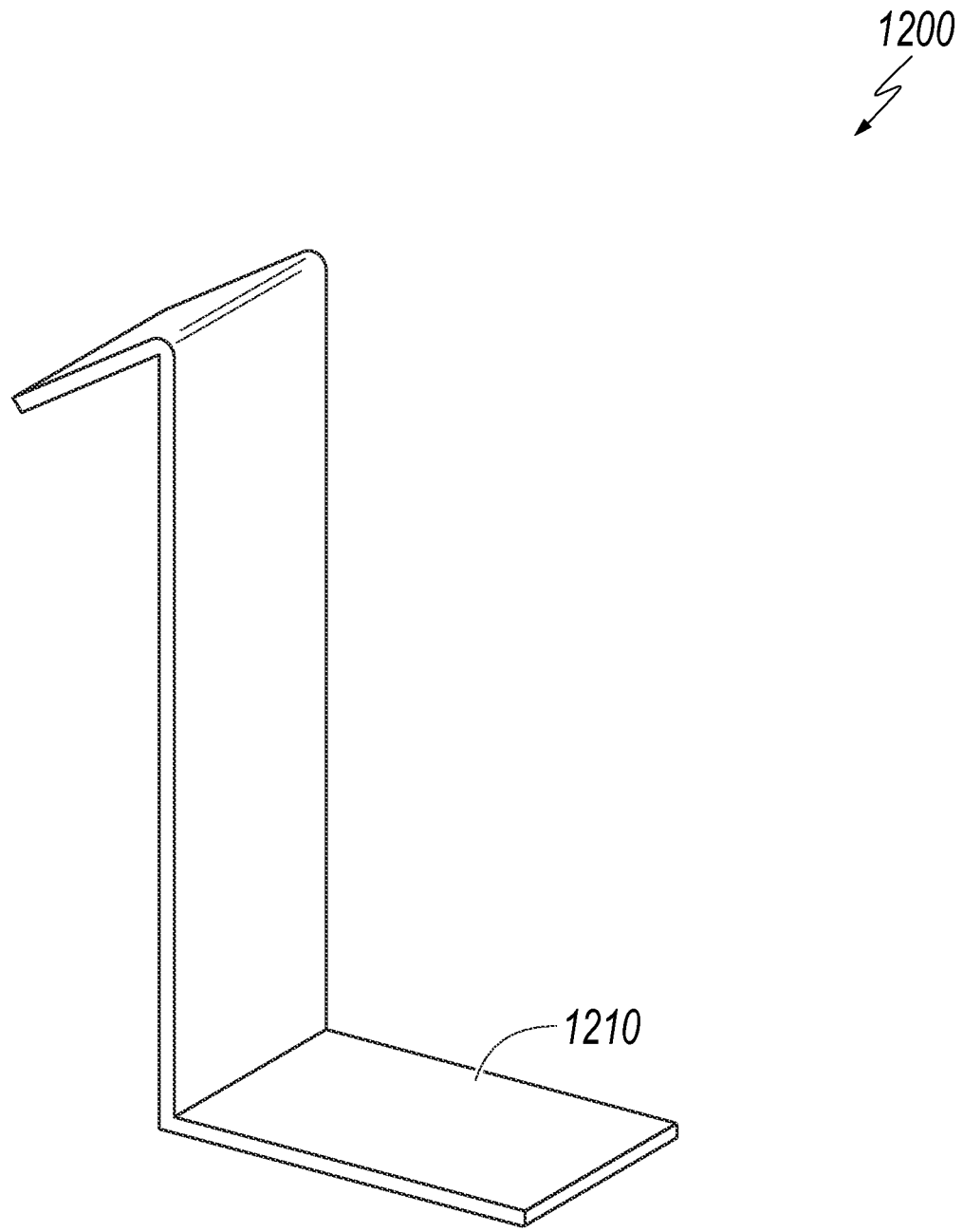
FIG. 12 illustrates a camera-positioning apparatus in a simple configuration as one molded piece of material.

FIG. 12 illustrates a camera-positioning apparatus 1200 in a simple configuration as one molded piece of material. The camera-positioning apparatus 1200 includes a shelf 1210 for supporting, for example, a webcam as described previously. In the example of FIG. 12, the shelf 1210 is stationary and is not movable vertically up and down a screen display to which the camera-positioning apparatus 1200 may be attached. In a typical embodiment, the camera-positioning apparatus 1200 is movable horizontally across the screen display in the fashion described previously.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of positioning a movable webcam connected to a computer relative to a screen display of the computer while imaging a user in select, reciprocal viewing alignment with the screen display, the method comprising:
   providing a screen display mounting for supporting the movable webcam in a variety of positions relative to the screen display, the screen display mounting comprising a display attachment and a mounting slide;
   securing the movable webcam to the mounting slide for imaging the user; and
   positioning the mounting in relationship to the screen display for supporting the movable webcam in a select screen display region substantially coextensive with an image being observed by the user, the positioning comprising:
      horizontal movement of the display attachment across an upper region of the screen display; and
      vertical movement of the mounting slide along the display attachment and parallel to the screen display; and
   wherein the viewing of the image by the user facilitates the viewing of the user viewing the image in select, reciprocal viewing alignment therewith.

2. An apparatus for positioning a movable webcam connected to a computer relative to a screen display of the computer while imaging a user in select, reciprocal viewing alignment with the screen display, the apparatus comprising:
   a generally transparent screen display attachment for mounting to and horizontal movement across an upper region of the screen display while suspended downwardly there across;
   a mounting slide for slidable securement to and reciprocating vertical movement along the generally transparent screen display attachment, parallel to the screen display, in support of the movable webcam in a variety of positions relative to the screen display; and
   a securing member for securing the movable webcam to the mounting slide for imaging the user; and
   wherein the generally transparent screen display attachment and the mounting slide are configured to be positioned in relationship to the screen display for supporting the movable webcam in a select screen display region substantially coextensive with an image being observed by the user, so that the viewing of the image by the user facilitates the viewing of the user viewing the image in select, reciprocal viewing alignment therewith.

3. The apparatus of claim 2 wherein the generally transparent screen display attachment comprises a generally transparent plastic member having an angulated upper region for hooked placement on, and concomitant suspension from, a top edge of the screen display.

4. The apparatus of claim 3 wherein the mounting slide comprises a transparent plastic mounting shelf adapted to slide vertically along the generally transparent screen display attachment for select positioning of the movable webcam.

5. The apparatus of claim 4 wherein the mounting slide is formed of substantially clear plastic and includes mounting jaws that slidably engage opposite sides of the generally transparent screen display attachment.

6. The apparatus of claim 5 wherein the mounting jaws are angulated relative to each other to impart an interference, slip fit with the generally transparent screen display attachment for temporary positioning there along.

7. The apparatus of claim 5, wherein the mounting jaws are angulated inward in a direction of the screen display attachment.

8. The apparatus of claim 5 wherein the mounting slide comprises a threaded member for facilitating secured positioning thereof.

9. The apparatus of claim 5 wherein the generally transparent screen display attachment is formed with an arcuate upper region for hanging along an upper edge of the screen display in support of the movable webcam.

10. An apparatus for positioning a movable webcam connected to a computer relative to a screen display of the computer while imaging a user in select, reciprocal viewing alignment with the screen display, the apparatus comprising:
   a screen display attachment of transparent material for mounting to and horizontal movement across an upper region of the screen display while extending downwardly thereacross;
   a mounting slide for slidable securement to and reciprocating vertical movement along the screen display attachment, parallel to the screen display, in support of the movable webcam in a variety of positions relative to the screen display; and
   a mounting slide for slidable securement to and vertical moment along the screen display attachment, parallel to the screen display, for support of the movable webcam in a variety of positions relative to the screen display; and wherein the screen display attachment is configured to be positioned in relationship to the screen display for supporting the movable webcam in a select screen display region substantially coextensive with an image being observed by the user, so that the viewing of the image by the user facilitates the viewing of the user viewing the image in select, reciprocal viewing alignment therewith.

11. The apparatus of claim 10 wherein the screen display attachment comprises a generally transparent plastic member having an angulated upper region for placement on and suspension from a top edge of the screen display.

12. The apparatus of claim 11 wherein the angulated upper region of the screen display attachment is substantially arcuate.

13. The apparatus of claim 12 wherein the angulated upper region is substantially U-shaped.

14. The apparatus of claim 11 wherein the angulated upper region of the screen display attachment comprises a generally bent section.

15. The apparatus of claim 14 wherein the generally bent section is angulated at an angle greater than 90 degrees.

16. The apparatus of claim 10 wherein the mounting slide comprises a shelf adapted to slide vertically along the screen display attachment for select positioning of the movable webcam.

17. The apparatus of claim 10 wherein the screen display attachment is formed of clear plastic with an upper region bent to form a hanger region for placement on and suspension from a top edge of the screen display, and the screen display attachment is formed with a lower section extending therefrom to form a shelf therewith for supporting the movable webcam.

\* \* \* \* \*